(12) United States Patent
Smith et al.

(10) Patent No.: US 6,682,591 B2
(45) Date of Patent: Jan. 27, 2004

(54) AQUEOUS INK COMPOSITIONS CONTAINING BORATE ESTERS

(75) Inventors: Thomas W. Smith, Penfield, NY (US); Jin Wu, Webster, NY (US)

(73) Assignee: Xerox Corporation, Stamford, CT (US)

( * ) Notice: Subject to any disclaimer, the term of this patent is extended or adjusted under 35 U.S.C. 154(b) by 175 days.

(21) Appl. No.: 10/035,555

(22) Filed: Nov. 9, 2001

(65) Prior Publication Data

US 2003/0127020 A1 Jul. 10, 2003

(51) Int. Cl.$^7$ .............................................. C09D 11/00
(52) U.S. Cl. ................... 106/31.58; 106/31.86; 106/31.49; 106/31.78; 106/31.47; 106/31.77
(58) Field of Search ........................ 106/31.58, 31.86, 106/31.49, 31.78, 31.47, 31.77; 347/100

(56) References Cited

U.S. PATENT DOCUMENTS

| | | | |
|---|---|---|---|
| 3,625,899 A | 12/1971 | Sawyer et al. | 252/75 |
| 4,192,759 A | 3/1980 | Hamanaka | 252/78.1 |
| 4,303,445 A | 12/1981 | Whitfield et al. | 106/22 |
| 4,537,824 A * | 8/1985 | Asano et al. | 428/323 |
| 4,975,211 A | 12/1990 | Small, Jr. et al. | 252/49.6 |
| 5,100,468 A * | 3/1992 | Yuasa et al. | 524/210 |
| 5,171,875 A | 12/1992 | Studnicka et al. | 558/296 |
| 5,492,952 A * | 2/1996 | Tonogaki et al. | 524/192 |
| 5,506,016 A * | 4/1996 | Onodera et al. | 428/40.9 |
| 5,746,810 A * | 5/1998 | Suzuki | 106/2 |
| 5,913,971 A * | 6/1999 | Fujimatsu et al. | 106/31.86 |
| 5,948,149 A | 9/1999 | Ito et al. | 106/31.13 |
| 5,972,087 A * | 10/1999 | Uraki et al. | 106/31.65 |
| 6,031,024 A * | 2/2000 | Uraki et al. | 523/161 |
| 6,124,350 A * | 9/2000 | Gaglani et al. | 514/478 |
| 6,235,099 B1 * | 5/2001 | Aida et al. | 106/31.65 |
| 6,451,103 B1 * | 9/2002 | Uemura et al. | 106/493 |

FOREIGN PATENT DOCUMENTS

| | | |
|---|---|---|
| GB | 1382418 | 1/1975 |
| JP | 57087480 A2 | 5/1982 |
| JP | 11012524 A2 | 1/1999 |
| JP | 2000104000 | 4/2000 |
| PL | 175836 B1 | 2/1999 |

OTHER PUBLICATIONS

J. Yao et al., "Improvement of Hydrolytic Stability of Borate Esters Used as Lubricant Additives," *Journal of the Society of Tribologists and Lubrication Engineers*, Jun. 1995, p. 475.

Y. Junbin et al., "The Hydrolytic Stability of Borates Used as Oil Additives," *Lubrication Science*, 7–4, Jul. 1995, p. 379.

D. Tanner et al., "Boric Acids Esters. I. A General Survey of Aromatic Ligands and the Kinetics and Mechanism of the Formation and Hydrolysis of Boric Acid Esters of Salicylamide, N–Phenylsalicylamide, and Disalicylimide," *J. Am. Chem. Soc.*, 89:26 (1967), Dec.

Copending application U.S. Ser. No. 10/040,464, filed concurrently herewith, entitled "Phase Change Inks Containing Borate Esters," by Thomas W. Smith and Suresh K. Ahuja, Now U.S. patent No. 6,585,816.

* cited by examiner

*Primary Examiner*—Mark L. Bell
*Assistant Examiner*—Veronica F. Faison
(74) *Attorney, Agent, or Firm*—Judith L. Byorick

(57) ABSTRACT

Disclosed is an ink composition comprising water, a colorant, and a borate ester, said ink containing water in an amount of at least about 5 percent by weight and containing water in an amount of no more than about 50 percent by weight, wherein either (a) the ink also contains an amine compound, or (b) the borate ester is hydrolytically stable.

23 Claims, No Drawings

1

AQUEOUS INK COMPOSITIONS CONTAINING BORATE ESTERS

Copending Application U.S. Pat. No. 6,585,816, filed concurrently herewith, entitled "Phase Change Inks Containing Borate Esters," with the named inventors Thomas W. Smith and Suresh K. Ahuja, the disclosure of which is totally incorporated herein by reference, discloses a phase change ink composition comprising a colorant and an ink vehicle, said ink being a solid at temperatures less than about 50° C., wherein the ink vehicle comprises a borate ester.

BACKGROUND OF THE INVENTION

The present invention is directed to ink compositions suitable for use in, among other applications, ink jet printing. More specifically, the present invention is directed to aqueous ink compositions containing relatively low amounts of water and also containing at least one borate ester compound. One embodiment of the present invention is directed to an ink composition comprising water, a colorant, and a borate ester, said ink containing water in an amount of at least about 5 percent by weight and containing water in an amount of no more than about 50 percent by weight, wherein either (a) the ink also contains an amine compound, or (b) the borate ester is hydrolytically stable.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension, Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol, 65, no. 9 (1 May 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

U.S. Pat. No. 4,303,445 (Whitfield et al.), the disclosure of which is totally incorporated herein by reference, discloses a process and composition for reducing or eliminating moisture in fluids suitable for use in ink jet systems without significantly changing the surface tension of these fluids. It has been discovered that mixing at least one borate ester derived from an aqueously miscible organic hydroxyl-containing compound, with a substantially non-aqueous printing medium will hygroscopically stabilize the printing medium, (maintain the printing medium substantially water-free) without significantly changing its surface tension.

U.S. Pat. No. 3,625,899 (Sawyer et al.), the disclosure of which is totally incorporated herein by reference, discloses a water-insensitive hydraulic fluid composition comprising from about 54.5 to about 92 percent by weight of at least one borate ester, from 0 to about 20 percent by weight of a polyoxyalkylene glycol, and from about 3 to about 43 percent by weight of a glycol monoether or diether diluent together with minor amounts of an alkaline buffer and an antioxidant, if desired. Such water-insensitive hydraulic fluids are high boiling compositions suitable for use as brake fluids.

U.S. Pat. No. 5,171,875 (Studnicka et al.), the disclosure of which is totally incorporated herein by reference, discloses the composition and application of highly branched borate esters which function as oil phases for use in personal care, textile, and related applications. The properties of these compounds which makes them well suited for these applications is the fact that they are substantive to fibers, hair, and skin, are very mild to the skin and eyes. These materials are surprisingly stable to hydrolysis.

U.S. Pat. No. 4,192,759 (Hamanaka), the disclosure of which is totally incorporated herein by reference, discloses brake fluids of good quality which increase wet equilibrium reflux boiling point without increasing rubber swelling property and disperse or dissolve homogeneously the additives and metals extracted from rubber brake cups and cylinder pipes which can be obtained by dissolving semipolar borates containing a bond represented by the formula

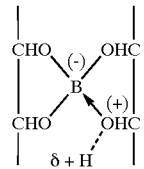

which can be a hybridized orbital between $SP^2$ and $SP^3$ with regard to boron atom and having at least two hydroxyl groups outside said bond and heteroborates comprising an $SP^2$ hybridized orbital and containing butyl group and methyl group in their molecule in polyalkylene glycol monoalkyl ethers comprising a $C_1$ to $C_4$ alkyl group.

U.S. Pat. No. 5,948,149 (Ito et al.), the disclosure of which is totally incorporated herein by reference, discloses a water-based ink composition in which the wettability, surface tension, antibacterial properties, and other properties are controlled based on a simple formulation. The water-based ink composition contains a semi-polar boron compound. Semi-polar boron compounds represented by diglycerin borate exhibit superior wettability in an ordinary environment, and addition of such a compound achieves a water-based ink composition well-balanced in surface tension, wettability, and drying property even if the composition is prepared according to a simple formulation. The optimum quantitative range for addition of the semi-polar boron compound depends on whether the coloring material contained in the watercolor ink composition is a dyestuff or a pigment. When the coloring material is a dyestuff, the quantitative range is preferably 0.5 to 3.0 percent by weight relative to the entire quantity of the water-based ink composition. When the coloring material is a pigment, the quantitative range is preferably 0.05 to 10 percent by weight relative to the same.

U.S. Pat. No. 4,975,211 (Small, Jr. et al.), the disclosure of which is totally incorporated herein by reference, discloses borated alkyl catechols that can be stabilized by the addition of diethylamine. Lubricating oils containing a borated alkyl catecholdiethylamine complex are effective in reducing oxidation, wear, and deposits in an internal combustion engine.

British Patent 1,382,418 (Sawyer et al.), the disclosure of which is totally incorporated herein by reference, discloses low water-sensitive hydraulic fluids containing borate esters and monoethanolamine.

Japanese Patent Publication JP 11012524 A2, the disclosure of which is totally incorporated herein by reference, discloses an aqueous gloss ink composition capable of readily redispersing a pigment and used by filling it in a writing tool or a painting tool such as a marking pen or a paint-brush pen. The ink contains at least 1.0 to 40 weight percent of a pigment containing a pearl pigment and/or a metal powder pigment, 0.1 to 5.0 weight percent of a dispersant containing at least a fatty acid ester of polyoxyethylene diglycerol borate, a resin and water.

Japanese Patent Publication JP 57087480 A2, the disclosure of which is totally incorporated herein by reference, discloses an ink containing a specific organoboronic compound, capable of imparting a high degree of wetting property to the ball of a ball-point pen, and good ink extrusion and transferring property to the surface of a writing paper without the paper slippage phenomenon. The ink is prepared by adding preferably 0.01 to 0.5 weight percent organoboronic compound expressed by the formula

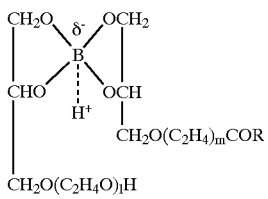

wherein R is a 7 to 21 C alkyl; l and m are integers 1 to 20 respectively, preferably l+m=24 to an aqueous ink composition for a ball-point pen containing a water-soluble dye, preservative, etc. in an aqueous solvent containing water as a principal component and 5 to 20 weight percent water-soluble polyhydric alcohol, e.g. ethylene glycol.

Japanese Patent Publication JP 2000104000, the disclosure of which is totally incorporated herein by reference, discloses glossy aqueous writing inks with drying prevention on pen tips. The inks contain ≦50 percent water, and ≧30 percent water-soluble organic solvents with boiling point of ≧120°. An ink containing Alpaste WXM U 75, a green pigment, Dispant EN 120A (pigment dispersant), 40.8 percent water, and 38.0 percent ethylene glycol showed a pen tip drying prevention of 30 times of that for an ink containing 78.8 percent water without the ethylene glycol.

Polish Patent Publication PL 175836 B1, the disclosure of which is totally incorporated herein by reference, discloses a brake fluid consisting of polyalkoxylated esters of boric acid (especially tris(3,6,9-trioxydecyl)borate) 20–25, an ether mixture (consisting of triethylene glycol methyl ether 50–70, tetraethylene glycol methyl ether 20–40, and higher ethers 5–10%) 35–55, an ether mixture (consisting of diethylene glycol butyl ether 60–70, triethylene glycol butyl ether 20–30, and tetraethylene glycol butyl ether 5–10%) 10–35, a diethylene glycol+triethylene glycol mixture (consisting of diethylene glycol 60–80 and triethylene glycol 20–40%) ≦10, diphenylolpropane ≦0.04, 1-methylene(diethanol) amino-4-methylbenzotriazole ≦0.04, reaction product of dodecenyl succinic anhydride and ethoxylated C18 fatty amine ≦0.08, and tricresylisopropyl phosphate ≦0.4%. The brake fluid is suitable for operation at ≦200°, is resistant to ≦4 weight percent water addition, does not corrode metals, and does not attack rubber.

J. Yao et al., "Improvement of Hydrolytic Stability of Borate Esters Used as Lubricant Additives," *Journal of the Society of Tribologists and Lubrication Engineers*, June 1995, p. 475, and Y. Junbin et al., "The Hydrolytic Stability of Borates Used as Oil Additives," *Lubrication Science* 7-4, July 1995, p. 379, the disclosures of each of which are totally incorporated herein by reference, disclose eleven borate ester compounds that were synthesized and their hydrolytic stabilities compared. The results indicated that the hydrolysis problem of borate esters can be better solved by introducing N,N-dialkylamino-ethyl group with alkyl radicals containing more than three carbon atoms. It is believed that the formation of a stable five-member ring structure in molecules involving coordination of nitrogen with boron substantially contributes to the resistance to hydrolysis of such type compounds.

D. Tanner et al., "Boric Acid Esters. I. A General Survey of Aromatic Ligands and the Kinetics and Mechanism of the Formation and Hydrolysis of Boric Acid Esters of Salicylamide, N-Phenylsalicylamide, and Disalicylimide," *J. Am. Chem. Soc.*, 89:26 (1967), the disclosure of which is totally incorporated herein by reference, discloses a spectrophotometric method developed to detect the presence of boric esters of substituted phenols in aqueous borate buffers. A large series of phenols and related compounds was so examined to evaluate the effects of the number, basicity, and steric bulk of the ligand groups and their geometry upon the stability of resulting boric esters. Quantitative rate constants were measured for the formation of stable boric esters of salicylamide, N-phenylsalicylamide, and disalicylimide under conditions of constant pH and large excess of borate buffer over substrate.

The presence of large amounts of water in inks used in thermal ink jet printing processes can cause difficulties such as cockle or paper distortion, particularly when solid areas are printed. When aqueous thermal ink jet inks have a large amount of the water therein replaced with organic cosolvents, the cosolvents commonly used typically have low surface tensions and rapid penetration characteristics, accordingly, inks made from such low water content inks can exhibit problems with poor line edge acuity. Traditional, slow-drying ink formulations that exhibit excellent line edge acuity typically contain more than about 50 percent by weight water and high boiling co-solvents, including glycols, 2-pyrrolidone, sulfolane, and the like, and have surface tension values of about 40 dynes per centimeter or more.

Accordingly, while known compositions and processes are suitable for their intended purposes, a need remains for improved aqueous inks. In addition, a need remains for aqueous inks suitable for use in ink jet printing processes. Further, a need remains for aqueous inks containing relatively low amounts of water. Additionally, a need remains for aqueous inks that, when used in ink jet printing processes, enable reduced paper cockle or distortion. There is also a need for aqueous inks that, when used in ink jet printing processes, generate images with good line edge acuity. In addition, there is a need for aqueous inks that, when used in ink jet printing processes, generate images with good optical density. Further, there is a need for aqueous inks that dry rapidly (typically in five seconds or less). Additionally, there is a need for aqueous inks that dissolve a broad array of dyes and efficiently disperse pigments.

SUMMARY OF THE INVENTION

The present invention is directed to an ink composition comprising water, a colorant, and a borate ester, said ink containing water in an amount of at least about 5 percent by weight and containing water in an amount of no more than about 50 percent by weight, wherein either (a) the ink also contains an amine compound, or (b) the borate ester is hydrolytically stable.

DETAILED DESCRIPTION OF THE INVENTION

The present invention is directed to an aqueous ink composition comprising an aqueous liquid vehicle, a colorant, and a borate ester. The liquid vehicle comprises a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas (including alkylated ureas), ethers, carboxylic acids and their salts, esters, alcohols, organosulfides, organosulfoxides (such as dimethyl sulfoxide), sulfones (such as sulfolane), alcohol derivatives, carbitol, butyl carbitol, cellusolve, tripropylene glycol monomethyl ether (such as DOWANOL® TPM), ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, 1,3-dimethyl-1,2-imidazolidinone, betaine, and other water soluble or water miscible materials, as well as mixtures thereof.

The inks of the present invention contain water in an amount of typically at least about 5 percent by weight of the ink, preferably at least about 10 percent by weight of the ink, and more preferably at least about 30 percent by weight of the ink, and typically no more than about 60 percent by weight of the ink, preferably no more than about 50 percent by weight of the ink, and more preferably no more than about 40 percent by weight of the ink, although the amount can be outside of these ranges.

The inks of the present invention also contain a colorant. The colorant can be a dye, a pigment, or a mixture thereof. Examples of suitable dyes include anionic dyes, cationic dyes, nonionic dyes, zwitterionic dyes, and the like, Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN, Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the PRO-JET ® series of dyes available from ICI, including PRO-JET® Yellow I (Direct Yellow 86), PRO-JET® Magenta I (Acid Red 249), PRO-JET® Cyan I (Direct Blue 199), PRO-JET® Black I (Direct Black 168), PRO-JET® Yellow 1-G (Direct Yellow 132), Aminyl Brilliant Red F-B, available from Sumitomo Chemical Company (Japan), the DUASYN® line of "salt-free" dyes available from Clariant Corp., Charlotte, N.C., such as DUASYN® Direct Black HEF-SF (Direct Black 168), DUASYN® Black RL-SF (Reactive Black 31), DUASYN® Direct Yellow 6G-SF VP216 (Direct Yellow 157), DUASYN® Brilliant Yellow GL-SF VP220 (Reactive Yellow 37), DUASYN® Acid Yellow XX-SF LP413 (Acid Yellow 23), DUASYN® Brilliant Red F3B-SF VP218 (Reactive Red 180), DUASYN® Rhodamine B-SF VP353 (Acid Red 52), DUASYN® Direct Turquoise Blue FRL-SF VP368 (Direct Blue 199), DUASYN® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company);

Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy), Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include RAVEN® 5250, RAVEN® 5750, RAVEN® 3500 and other similar carbon black products available from Columbia Company, REGAL® 330, BLACK PEARL® L, BLACK PEARL® 1300, and other similar carbon black products available from Cabot Company, commercial carbon black dispersions such as CABOJET® 200, CABOJET® 300 (surface modified pigment), CABOJET®IJX 157, CABOJET® IJX 164, and the like, available from Cabot Chemical Co., the BON-JET® pigment dispersions from Orient Chemical Company of Japan, Degussa carbon blacks such as COLOR BLACK® series, SPECIAL BLACK® series, PRINTTEX® series and DERUSSOL® carbon black dispersions available from Degussa Company, HOSTAFINE® series such as HOSTAFINE® Yellow GR (Pigment 13), HOSTAFINE® Yellow (Pigment 83), HOSTAFINE® Red FRLL (Pigment Red 9), HOSTAFINE® Rubine F6B (Pigment 184), HOSTAFINE® Blue 2G (Pigment Blue 15:3), HOSTAFINE® Black T (Pigment Black 7), and HOSTAFINE® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration Typically, the pigment is present in an amount of from about 0.1 to about 8 percent by weight of the ink, and preferably from about 2 to about 7 percent by weight of the ink, although the amount can be outside these ranges.

The inks of the present invention further contain a borate ester compound.

Examples of suitable borate esters for the inks of the present invention include those of the general formula

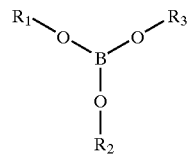

wherein $R_1$, $R_2$, and $R_3$ each, independently of the others, is an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from about 2 to about 30 carbon atoms, preferably with from about 2 to about 20 carbon atoms, and more preferably with from about 2 to about 12 carbon atoms, although the number of carbon atoms can be outside of these ranges, an aryl group (including substituted aryl groups), typically with from about 6 to about 24 carbon atoms, preferably with from about 6 to about 15 carbon atoms, and more preferably with from about 6 to about 12 carbon atoms, although the number of carbon atoms can be outside of these ranges, an arylalkyl group (including substituted arylalkyl groups), typically with from about 7 to about 25 carbon atoms, preferably with from about 7 to about 16 carbon atoms, and more preferably with from about 7 to about 13 carbon atoms, although the number of carbon atoms can be outside of these ranges, such as benzyl or the like, an alkylaryl group (including substituted alkylaryl groups), typically with from about 7 to about 25 carbon atoms, preferably with from about 7 to about 16 carbon atoms, and more preferably with from about 7 to about 13 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from about 2 to about 30 carbon atoms, preferably with from about 2 to about 20 carbon atoms, and more preferably with from about 2 to about 12 carbon atoms, although the number of carbon atoms can be outside of these ranges, a polyalkyleneoxy group (including substituted polyalkyleneoxy groups), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring, and wherein $R_1$, $R_2$, and/or $R_3$ can be joined together to form an aliphatic or aromatic ring, and those of the general formulae

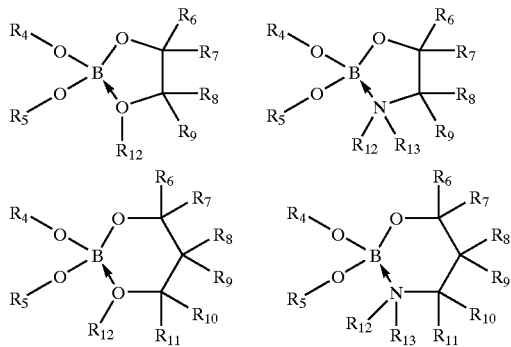

wherein $R_4$ and $R_5$ each, independently of the other, is an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from about 2 to about 30 carbon atoms, preferably with from about 2 to about 20 carbon atoms, and more preferably with from about 2 to about 12 carbon atoms, although the number of carbon atoms can be outside of these ranges, an aryl group (including substituted aryl groups), typically with from about 6 to about 24 carbon atoms, preferably with from about 6 to about 15 carbon atoms, and more preferably with from about 6 to about 12 carbon atoms, although the number of carbon atoms can be outside of these ranges, an arylalkyl group (including substituted arylalkyl groups), typically with from about 7 to about 25 carbon atoms, preferably with from about 7 to about 16 carbon atoms, and more preferably with from about 7 to about 13 carbon atoms, although the number of carbon atoms can be outside of these ranges, such as benzyl or the like, an alkylaryl group (including substituted alkylaryl groups), typically with from about 7 to about 25 carbon atoms, preferably with from about 7 to about 16 carbon atoms, and more preferably with from about 7 to about 13 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from about 2 to about 30 carbon atoms, preferably with from about 2 to about 20 carbon atoms, and more preferably with from about 2 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 3 to about 60 repeat alkyleneoxy units, preferably with from about 3 to about 30 repeat alkyleneoxy units, and more preferably with from about 3 to about 20 repeat alkyleneoxy units, although the number of repeat alkyleneoxy units can be outside of these ranges, wherein $R_4$ and $R_5$ can be joined together to form a ring, $R_6$, $R_7$, $R_8$, $R_9$, $R_{10}$, and $R_{11}$ each, independently of the other, is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 22 carbon atoms, preferably with from 1 to about 12 carbon atoms, and more preferably with from 1 to about 6 carbon atoms, although the number of carbon atoms can be outside of these ranges, an aryl group (including substituted aryl groups), typically with from about 6 to about 22 carbon atoms, preferably with from about 6 to about 15 carbon atoms, and more preferably with from about 6 to about 10 carbon atoms, although the number of carbon atoms can be outside of these ranges, an arylalkyl group (including substituted arylalkyl groups), typically with from about 7 to about 22 carbon atoms, preferably with from about 7 to about 15 carbon atoms, and more preferably with from about 7 to about 12 carbon atoms, although the number of carbon atoms can be outside of these ranges, such as benzyl or the like, an alkylaryl group (including substituted alkylaryl groups), typically with from about 7 to about 22 carbon atoms, preferably with from about 7 to about 15 carbon atoms, and more preferably with from about 7 to about 12 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 22 carbon atoms, preferably with from 1 to about 12 carbon atoms, and more preferably with from 1 to about 7 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 3 to about 30 repeat alkyleneoxy units, preferably with from about 3 to about 20 repeat alkyleneoxy units, and more preferably with from about 3 to about 10 repeat alkyleneoxy units, although the number of repeat alkyleneoxy units can be outside of these ranges, a hydroxy group, an amine group, a pyridine group, an ether group, an ester group, an amide group, a carbonyl group, mixtures thereof, and the like, wherein one or more of $R_6$, $R_7$, $R_8$, $R_9$, $R_{10}$, and $R_{11}$ can be absent if a ring carbon atom has a double bond or a triple bond to another R group or to another ring carbon atom (for example, if $R_6$ is a=O carbonyl group, $R_7$ would be absent), and $R_{12}$ and $R_{13}$ each, independently of the other, is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 30 carbon atoms, preferably with from 1 to about 20 carbon atoms, and more preferably with from 1 to about 12 carbon atoms, although the number of carbon atoms can be outside of these ranges, an aryl group (including substituted aryl groups), typically with from about 6 to about 24 carbon atoms, preferably with from about 6 to about 15 carbon atoms, and more preferably with from about 6 to about 12 carbon atoms, although the number of carbon atoms can be outside of these ranges, an arylalkyl group (including substituted arylalkyl groups), typically with from about 7 to about 25 carbon atoms, preferably with from about 7 to about 16 carbon atoms, and more preferably with from about 7 to about 13 carbon atoms, although the number of carbon atoms can be outside of these ranges, such as benzyl or the like, an alkylaryl group (including substituted alkylaryl groups), typically with from about 7 to about 25 carbon atoms, preferably with from about 7 to about 16 carbon atoms, and more preferably with from about 7 to about 13 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, wherein $R_6$, R7, $R_8$, $R_9$, $R_{10}$, $R_{11}$, $R_{12}$, and/or $R_{13}$ can be joined together to form a ring, and wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring.

Specific examples of suitable borate esters for the inks of the present invention include disorbitan borate, of the formula

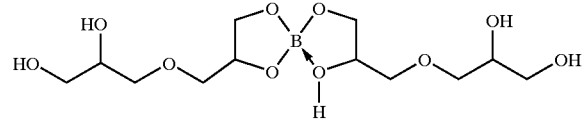

disorbitol borate, of the formula

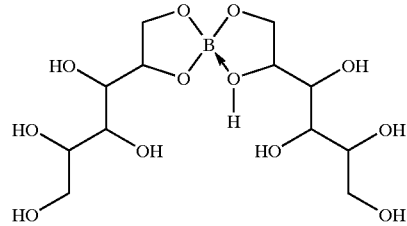

borate esters of glycerin monoethoxylate, of the formula

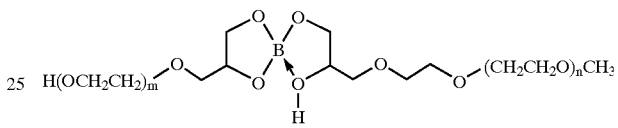

wherein m and n are integers representing the number of repeat —(OCH$_2$CH$_2$)— units, typically each being from about 2 to about 60, and preferably from about 2 to about 30, although the values of m and n can be outside of these ranges, diglycerol borate, of the formula

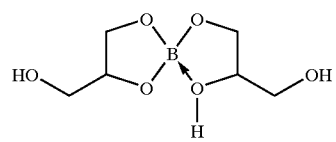

N,N-dibutylethanolamine glycerol borate, of the formula

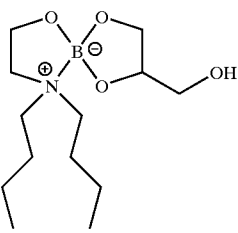

glycerol borate monoesters, of the formula

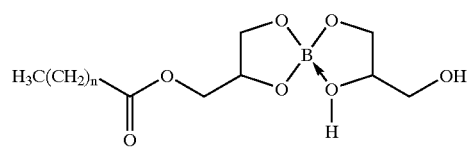

wherein n is an integer representing the number of repeat —CH$_2$— units, and typically is from 0 to about 20, and preferably from 0 to about 12, although the value of n can be outside of these ranges, sorbitol glycerol borate, of the formula

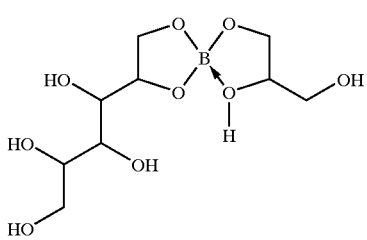

bis-neopentylglycol borate, of the formula

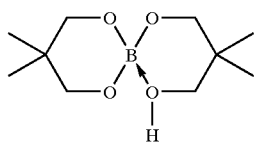

trimethylene borate (Aldrich Chemical 19,319-4), of the formula

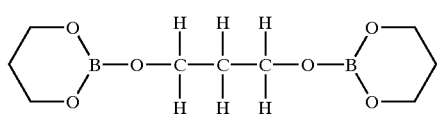

glycerol salicylamide borate, of the formula

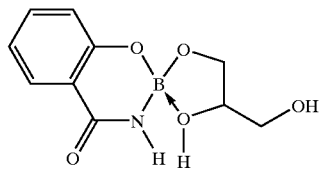

borate ester of polyethylene glycol methyl ether, of the formula

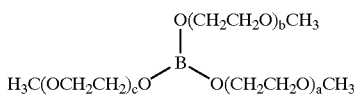

wherein a, b, and c are each integers representing the number of repeat ethylene oxide units, and a, b, and c each, independently of the others, typically is from about 3 to about 60, preferably from about 3 to about 30, and more preferably from about 3 to about 20, although the values of a, b, and c can be outside of these ranges, triethylene glycol monomethyl ether borate, of the formula

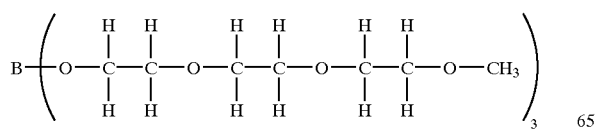

salicylamide borate, of the formula

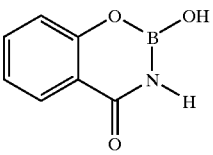

N,N-dibutylethanolamine sorbitol borate, of the formula

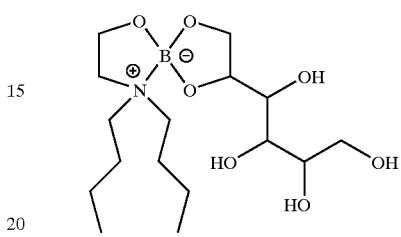

salicylamide sorbitol borate, of the formula

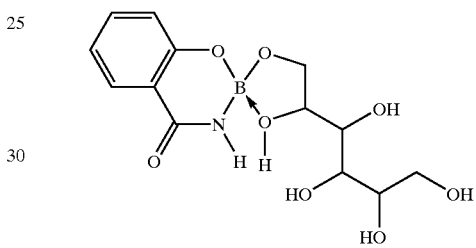

and the like, as well as mixtures thereof.

Other borate esters not within these formulae can also be employed.

In addition to monomeric borate esters, polymers and copolymers of borate esters can also be used in the inks of the present invention. Copolymers of borate esters can be prepared by any known or desired method, such as by known methods for forming polyesters. For example, a monomeric borate ester compound having two primary or secondary alcohol groups thereon can be condensed with a diacid, such as those of the general formula HOOC—R—COOH, wherein R is an alkylene group, typically with from about 8 to about 82 carbon atoms, although the number of carbon atoms can be outside of this range, to extrude water and form a copolymer, as follows:

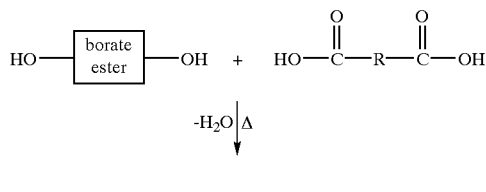

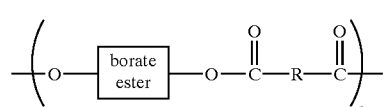

wherein n is an integer representing the number of repeat monomer units. Similarly, a borate ester having two acetyl groups thereon can be reacted with a diacid, such as those of the general formula HOOC—R—COOH, wherein R is an alkylene group, typically with from about 2 to about 22 carbon atoms, although the number of carbon atoms can be outside of this range, heating to extrude acetic acid and to form a copolymer, as follows:

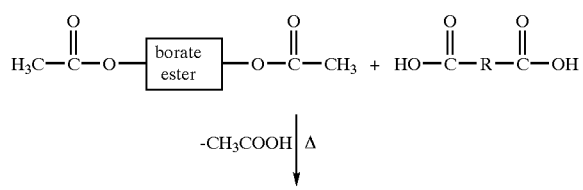

-CH₃COOH | Δ

-continued

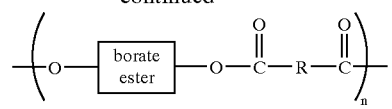

wherein n is an integer representing the number of repeat monomer units. In addition, a monomeric borate ester compound having two primary or secondary alcohol groups thereon can be reacted with a polyester to incorporate random monomer units of the borate ester into the polyester. For example, heating polyethylene terephthalate and diglycerol borate can result in extrusion of ethylene glycol and the formation of a random copolyester, as follows:

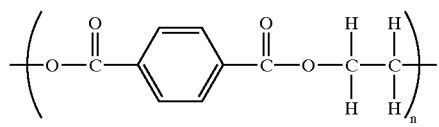

+

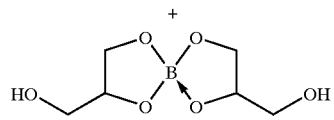

-HOCH₂CH₂OH | Δ

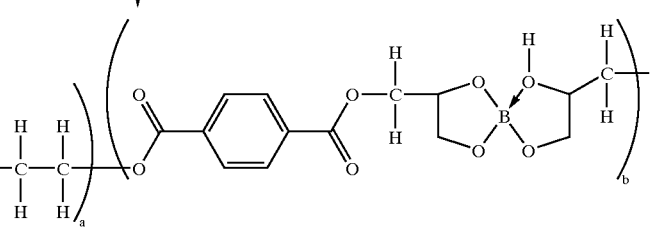

-continued

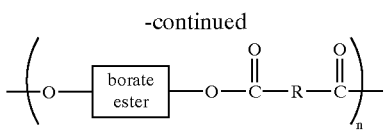

wherein n is an integer representing the number of repeat monomer units. Similarly, monomeric borate ester compound having two primary or secondary alcohol groups thereon can be reacted with a diester, such as those of the general formula H₃COOC—R—COOCH₃, wherein R is an alkylene group, typically with from about 2 to about 22 carbon atoms, although the number of carbon atoms can be outside of this range, heating to extrude methanol and to form a copolymer, as follows:

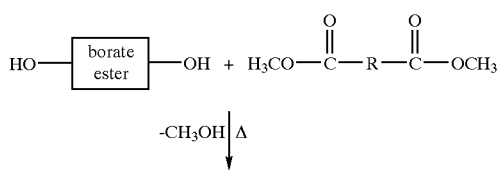

-CH₃OH | Δ wherein a and b are integers representing the number of repeat monomer units. Polymeric borate esters are also disclosed in, for example, JP 11012524 A2, the disclosure of which is totally incorporated herein by reference. Borate ester compounds suitable for the inks of the present invention also include polymers having at least some repeat monomer units derived from monomeric borate esters.

Borate ester compounds suitable for the inks of the present invention are commercially available as, for example, MTG-100 and HOSTACOR BF, available from Clariant Corporation, Charlotte, N.C., HI BORON, available from Boron International Ltd., Tokyo, Japan, the EMULBON series, such as CAS number 83609-03-4 and CAS number 83619-51-6, and the like. These compounds can also be prepared by admixing boric acid with a primary or secondary alcohol or alkanolamine that will result in the desired ester compound in the presence of toluene and heating the mixture to azeotrope out water resulting from the reaction.

Examples of alcohols from which borate esters suitable for the inks of the present invention can be prepared include those of the general formula

R—OH wherein R is an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from about 2 to about 30 carbon atoms, preferably with from about 2 to about 20 carbon atoms, and more preferably with from about 2 to about 10 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 12 carbon atoms, although the number of carbon atoms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon atoms can be outside of these ranges, such as benzyl or the like, an alkylaryl group (including substituted alkylaryl groups), typically with from about 7 to about 30 carbon atoms, preferably with from about 7 to about 20 carbon atoms, and more preferably with from about 7 to about 12 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from about 2 to about 30 carbon atoms, preferably with from about 2 to about 20 carbon atoms, and more preferably with from about 2 to about 12 carbon atoms, although the number of carbon atoms can be outside of these ranges, a polyalkyleneoxy group (including substituted polyalkyleneoxy groups), such as polyethyleneoxy groups, polypropyleneoxy groups, polybutyleneoxy groups, and the like, typically with from about 3 to about 60 repeat alkyleneoxy units, preferably with from about 3 to about 30 repeat alkyleneoxy units, and more preferably with from about 3 to about 20 repeat alkyleneoxy units, although the number of repeat alkyleneoxy units can be outside of these ranges, wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring.

Examples of alcohols from which cyclic borate esters suitable for the inks of the present invention can be prepared include those of the general formulae

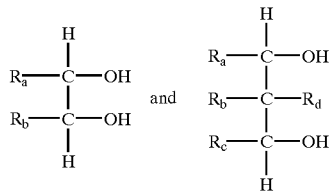

and examples of suitable alkanolamines from which cyclic borate esters suitable for the inks of the present invention can be prepared include those of the general formulae

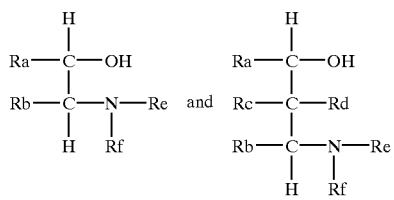

wherein $R_a$, $R_b$, $R_c$, $R_d$, $R_e$, and $R_f$ each, independently of the others, can be a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 22 carbon atoms, preferably with from 1 to about 12 carbon atoms, and more preferably with from 1 to about 6 carbon atoms, although the number of carbon atoms can be outside of these ranges, an aryl group (including substituted aryl groups), typically with from about 6 to about 22 carbon atoms, preferably with from about 6 to about 15 carbon atoms, and more preferably with from about 6 to about 10 carbon atoms, although the number of carbon atoms can be outside of these ranges, an arylalkyl group (including substituted arylalkyl groups), typically with from about 7 to about 22 carbon atoms, preferably with from about 7 to about 15 carbon atoms, and more preferably with from about 7 to about 12 carbon atoms, although the number of carbon atoms can be outside of these ranges, such as benzyl or the like, an alkylaryl group (including substituted alkylaryl groups), typically with from about 7 to about 22 carbon atoms, preferably with from about 7 to about 15 carbon atoms, and more preferably with from about 7 to about 12 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 22 carbon atoms, preferably with from 1 to about 15 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 3 to about 60 repeat alkyleneoxy units, preferably with from about 3 to about 30 repeat alkyleneoxy units, and more preferably with from about 3 to about 10 repeat alkyleneoxy units, although the number of repeat alkyleneoxy units can be outside of these ranges, a hydroxy group, an amine group, a pyridine group, an ether group, an ester group, an amide group, a carbonyl group, mixtures thereof, and the like, wherein $R_a$, $R_b$, $R_c$, $R_d$, $R_e$, and/or $R_f$ can be joined together to form a ring, and wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring. For example, when $R_a$, $R_b$, $R_c$, $R_d$, $R_e$, and/or $R_f$ are themselves or are substituted with ester groups, these groups can be of the formula

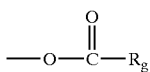

wherein $R_g$ is defined as $R_a$ through $R_f$ above. Examples of materials within these general formulae include

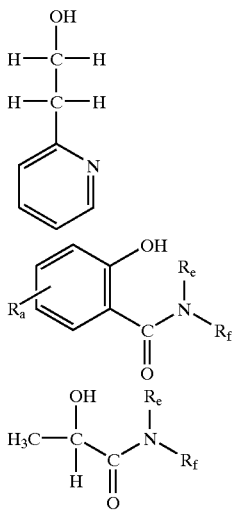

and the like.

Specific examples of suitable alcohols and alkanolamines include glycerol, sorbitol, xylitol, mannitol, glyceroloxyglycerol, 1,3-propanediol, triethylene glycol monomethyl ether, glycerin laurate, di-N-butylethanolamine, the Guerbet alcohols, and the like. Specific examples of suitable hydroxyamides include salicylamide, lactamide, and the like.

The borate ester is present in the ink in any desired or effective amount, typically at least about 5 percent by weight of the ink, preferably at least about 10 percent by weight of the ink, and more preferably at least about 20 percent by weight of the ink, and typically no more than about 50 percent by weight of the ink, preferably no more than about 40 percent by weight of the ink, and more preferably no more than about 30 percent by weight of the ink, although the amount can be outside of these ranges.

Hydrolytically stable borate esters can be used in the inks of the present invention without any stabilizing agent being present. If the borate ester is hydrolytically unstable, such that upon contact with water the borate ester decomposes to boric acid and the corresponding alcohol, the inks of the present invention can further contain an amine stabilizing agent. Examples of suitable amines include those of the general formula

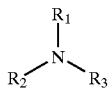

wherein $R_1$, $R_2$, and $R_3$ each, independently of the others, can be hydrogen, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 22 carbon atoms, preferably with from 1 to about 12 carbon atoms, and more preferably with from 1 to about 7 carbon atoms, although the number of carbon atoms can be outside of these ranges, an aryl group (including substituted aryl groups), typically with from about 6 to about 30 carbon atoms, preferably with from about 6 to about 15 carbon atoms, and more preferably with from about 6 to about 12 carbon atoms, although the number of carbon atoms can be outside of these ranges, an arylalkyl group (including substituted arylalkyl groups), typically with from about 7 to about 30 carbon atoms, preferably with from about 7 to about 15 carbon atoms, and more preferably with from about 7 to about 12 carbon atoms, although the number of carbon atoms can be outside of these ranges, such as benzyl or the like, an alkylaryl group (including substituted alkylaryl groups), typically with from about 7 to about 30 carbon atoms, preferably with from about 7 to about 15 carbon atoms, and more preferably with from about 7 to about 12 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 22 carbon atoms, preferably with from 1 to about 12 carbon atoms, and more preferably with from 1 to about 7 carbon atoms, although the number of carbon atoms can be outside of these ranges, a polyalkyleneoxy group (including substituted polyalkyleneoxy groups), such as polyethyleneoxy groups, polypropyleneoxy groups, polybutyleneoxy groups, and the like, typically with from about 3 to about 60 repeat alkyleneoxy units, preferably with from about 3 to about 30 repeat alkyleneoxy units, and more preferably with from about 3 to about 20 repeat alkyleneoxy units, although the number of repeat alkyleneoxy units can be outside of these ranges, wherein two or more of $R_1$, $R_2$, and/or $R_3$ can be joined together to form a ring, wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring, and wherein at least one of $R_1$, $R_2$, and $R_3$ is not hydrogen. In some instances tertiary amines are preferred, but secondary and primary amines can also be used.

Specific examples of suitable amine compounds include monoethanolamine, diethylamine, diethylamine diethanolamine, N,N-dibutylethanol amine, 2-hydroxyethylpyridine, 3-hydroxy-2-hydroxymethylpyridine, 2-hydroxymethylpyridine, 1-(2-hydroxyethylpyrrolidine), (4-(2-diethylamine, hydroxy ethyl)-1-piperazine propanesulfonic acid), triethanol amine, triethanolamine ethoxylate, and the like, as well as mixtures thereof.

When present, the amine is present in the ink in any desired or effective amount, typically at least about 1 percent by weight of the ink, preferably at least about 2 percent by weight of the ink, and more preferably at least about 5 percent by weight of the ink, and typically no more than about 10 percent by weight of the ink, although the amount can be outside of these ranges.

Hydrolytically stable borate esters, for which no amine stabilizing agent is needed, include those having a nitrogen atom coordination bonded to the boron atom, such as those of the general formulae

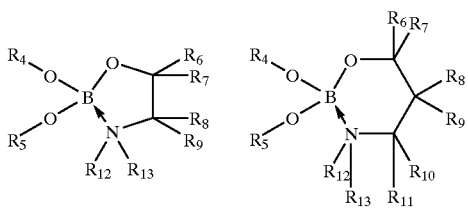

wherein the R groups are defined as indicated hereinabove. In a specific embodiment, the nitrogen atom coordination bonded to the boron atom has two other substituents ($R_{12}$ and $R_{13}$ for materials of the above formulae, for example) that are both alkyl groups with three or more carbon atoms, and preferably with four or more carbon atoms. Specific examples of such borate esters include (but are not limited to)

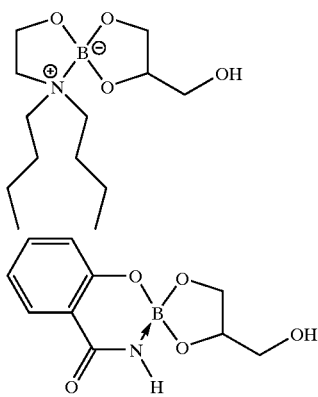

and the like. Hydrolytically stable borate esters also include those derived from Guerbet alcohols. Guerbet alcohols are beta-branched alcohols of the general formula

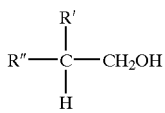

wherein R' and R" each, independently of the other, are alkyl groups (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 22 carbon atoms, preferably with from 1 to about 12 carbon atoms, and more preferably with from 1 to about 7 carbon atoms, although the number of carbon atoms can be outside of these ranges, aryl groups (including substituted aryl groups), typically with from about 6 to about 30 carbon atoms, preferably with from about 6 to about 15 carbon atoms, and more preferably with from about 6 to about 12 carbon atoms, although the number of carbon atoms can be outside of these ranges, arylalkyl groups (including substituted arylalkyl groups), typically with from about 7 to about 30 carbon atoms, preferably with from about 7 to about 15 carbon atoms, and more preferably with from about 7 to about 12 carbon atoms, although the number of carbon atoms can be outside of these ranges, such as benzyl or the like, alkylaryl groups (including substituted alkylaryl groups), typically with from about 7 to about 30 carbon atoms, preferably with from about 7 to about 15 carbon atoms, and more preferably with from about 7 to about 12 carbon atoms, although the number of carbon atoms can be outside of these ranges, alkoxy groups (including substituted alkoxy groups, and wherein hetero atoms, such as oxygen, nitrogen, sulfur, silicon, phosphorus, and the like can be present in the alkoxy group), typically with from 1 to about 22 carbon atoms, preferably with from 1 to about 12 carbon atoms, and more preferably with from 1 to about 7 carbon atoms, although the number of carbon atoms can be outside of these ranges, polyalkyleneoxy groups (including substituted polyalkyleneoxy groups), such as polyethyleneoxy groups, polypropyleneoxy groups, polybutyleneoxy groups, and the like, typically with from about 3 to about 60 repeat alkyleneoxy units, preferably with from about 3 to about 30 repeat alkyleneoxy units, and more preferably with from about 3 to about 20 repeat alkyleneoxy units, although the number of repeat alkyleneoxy units can be outside of these ranges, wherein R' and R" can be joined together to form a ring, and wherein the substituents on the substituted alkyl, aryl, arylalkyl, alkylaryl, alkoxy, and polyalkyleneoxy groups can be (but are not limited to) hydroxy groups, amine groups, ammonium groups, pyridine groups, pyridinium groups, ether groups, ester groups, amide groups, carbonyl groups, mixtures thereof, and the like, wherein two or more substituents can be joined together to form a ring.

Borate esters prepared from Guerbet alcohols include those of the general formula

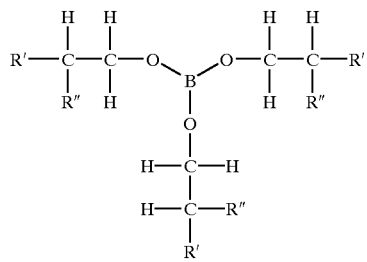

wherein R' and R" are as defined above for the Guerbet alcohols.

Some examples of borate esters prepared from Guerbet alcohols that are suitable for the present invention include (but are not limited to) borate esters of isobutyl alcohol, of the formula

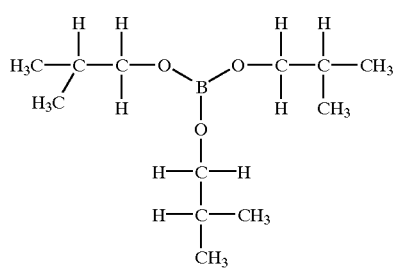

heteroborate esters of isobutyl alcohol and N,N-dibutylaminoethanol, of the formula

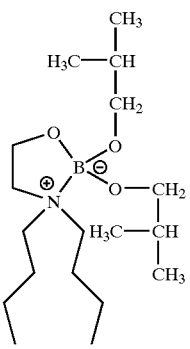

borate esters of polypropylene glycol, of the formula

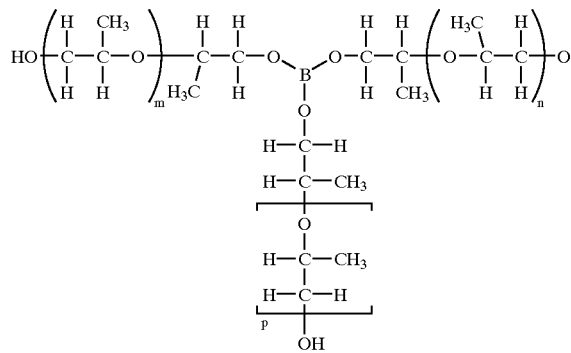

wherein m, n, and p are each, independently of the others, integers representing the number of repeat propylene oxide units, borate esters of propylene glycol/ethylene glycol copolymers, and the like.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink (although no biocide may be needed in view of the natural biocidal activity of borate esters), pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

The ink compositions are generally of a viscosity suitable for use in thermal ink jet printing processes. At room temperature (i.e., about 25° C.), typically, the ink viscosity is no more than about 10 centipoise, and preferably is from about 1 to about 7 centipoise, more preferably from about 1 to about 5 centipoise, although the viscosity can be outside this range.

Ink compositions of the present invention can be of any suitable or desired pH. For some embodiments, such as thermal ink jet printing processes, typical pH values are from about 2 to about 11, preferably from about 3 to about 10, and more preferably from about 3.5 to about 9, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink of the present invention into an ink jet printing apparatus and causing droplets of the inks to be ejected in an imagewise pattern onto a recording substrate. In one specific embodiment, the printing apparatus employs a thermal ink jet process wherein the ink in the nozzles is selectively heated in an imagewise pattern, thereby causing droplets of the ink to be ejected in imagewise pattern. In another specific embodiment, the printing apparatus employs an acoustic ink jet process, wherein droplets of the ink are caused to be ejected in imagewise pattern by acoustic beams. In yet another specific embodiment, the printing apparatus employs a piezoelectric ink jet printing process, wherein droplets of the ink are caused to be ejected in imagewise pattern by oscillations of piezoelectric vibrating elements. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

SYNTHESIS OF BORATE ESTERS

All of the borate esters were synthesized by simple esterification reactions between a specific alcohol or polyol and boric acid in toluene. No catalyst was added, and toluene was used to remove water continuously from the reaction by azeotropic distillation.

EXAMPLE I

N,N-dibutylethanolamine glycerol borate was prepared as follows. Boric acid (10.3 grams), glycerol (15.3 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a brownish viscous liquid product (~45 grams) of N,N-dibutylethanolamine/glycerol borate was obtained.

EXAMPLE II

N,N-dibutylethanolamine sorbitol borate was prepared as follows. Boric acid (10.3 grams), sorbitol (30.4 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a yellowish resinous product (~60 grams) of N,N-dibutylethanolamine/sorbitol borate was obtained.

EXAMPLE III

Salicylamide/glycerol borate was prepared as follows. Boric acid (10.3 grams), glycerol (15.3 grams), and salicylamide (22.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a yellowish resinous product (~40 grams) of salicylamide/glycerol borate was obtained.

EXAMPLE IV

Salicylamide/sorbitol borate was prepared as follows. Boric acid (10.3 grams), sorbitol (30.4 grams), and salicylamide (22.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a yellowish resinous product (~55 grams) of salicylamide/sorbitol borate was obtained.

EXAMPLE V

N,N-dibutylethanolamine/triethylene glycol monobutyl ether borate was prepared as follows. Boric acid (10.3 grams), triethylene glycol monobutyl ether (Fluka, 64.1 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a brownish liquid product (~90 grams) of N,N-dibutylethanolamine/triethylene glycol monobutyl ether borate was obtained.

EXAMPLE VI

N,N-dibutylethanolamine/poly(propylene glycol) monobutyl ether borate was prepared as follows. Boric acid (10.3 grams), poly(propylene glycol) monobutyl ether (Aldrich, average $M_n$=340, 113.3 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a brownish liquid product (~140 grams) of N,N-dibutylethanolamine/poly(propylene glycol) monobutyl ether borate was obtained.

EXAMPLE VII

Diglycerol borate, of the formula

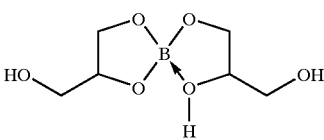

was prepared as follows. Boric acid (10.3 grams) and glycerol (30.6 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a viscous liquid product (~30 grams) of diglycerol borate was obtained.

EXAMPLE VIII

Glycerol borate laurate, of the formula

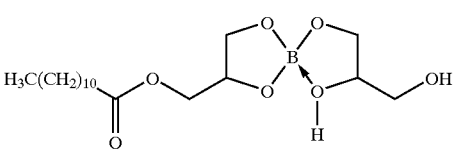

is prepared as follows. Boric acid (10.3 grams), glycerol (15.3 grams), and

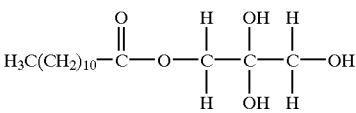

(48.322 grams) are added to a 250 milliliter flask. One hundred fifty milliliters of toluene is then added. The reaction is allowed to proceed overnight at 110° C., and the byproduct water (~9 grams) is continuously removed from the reaction by azeotropic distillation. The final solution is evaporated to remove toluene under vacuum, and a glycerol borate laurate product is obtained.

EXAMPLE IX

Sorbitan glycerol borate is prepared as follows. Boric acid (10.3 grams), glycerol (15.3 grams), and sorbitan (27.3 grams) are added to a 250 milliliter flask. One hundred fifty milliliters of toluene is then added. The reaction is allowed to proceed overnight at 110° C., and the byproduct water (~9 grams) is continuously removed from the reaction by azeotropic distillation. The final solution is evaporated to remove toluene under vacuum, and a sorbitan glycerol borate product is obtained.

INK FORMULATION AND CHARACTERIZATION

EXAMPLE X

Ink compositions were prepared by simple mixing of the following ingredients in the following order:

|  | Order | | | | | |
|---|---|---|---|---|---|---|
| Ingredient | 1 CAB-OJET 200 | 2 deionized water | 3 form-amide | 4 2-(dibutyl-amino) ethanol/ glycerol borate | 5 2-(dibutyl-amino) ethanol/ sorbitol borate | 6 triethylene glycol monoethyl ether borate |
| Ink #1 | 20 | 15 | 45 | 20 | 0 | 0 |
| Ink #2 | 20 | 25 | 20 | 10 | 0 | 25 |
| Ink #3 | 20 | 10 | 50 | 0 | 20 | 0 |

Ink #2 exhibited a surface tension of 42.5 dynes per centimeter, a viscosity of 8.55 centipoise at 25° C., and a viscosity of 3.95 at 50° C. The ink was printed with a XEROX® M-750 ink jet printer on HAMMERMILL Copy-Plus paper, XEROX® High Tech Laser paper, XEROX® Color Xpressions paper, XEROX® High Tech Ink Jet paper, XEROX® Business Paper, FUJI XEROX® WR100 paper, and XEROX® Digital Paper (Ripasa). Optical density values averaged 0.9. Dry times were less than 5 seconds, and very little cockle was observed in large solid printed areas. When printed with a yellow ink, intercolor bleed values averaged 10. MFLEN values averaged 20. Intercolor bleed was measured as a MFLEN value. Intercolor bleed (ICB) usually is caused by undesirable mixing of inks near the bordering areas (adjacent to each other, such as black ink next to yellow ink, and the like) and results in a distorted line image with irregular edges and large MFLEN values. The smaller MFLEN number is desirable because it shows sharper line image with reduced intercolor bleed. The average MFLEN (Mid Frequency Line Edge Noise, Horizontal lines) measures line edge raggedness. The MFLEN number was obtained by equipment consisting of a personal computer, an illuminating light source, a filter, and an imaging microscope with a CDD sensor (light sensor). The equipment was calibrated with a standard image (line with sharp edges and known width). Software using a Fourier Transform technique was used to calculate the MFLEN data and line width.

Ink #1 and Ink #3 were applied to the above papers by draw-down coating and exhibited average optical density values of about 1.1.

EXAMPLE XI

Ink compositions are prepared by simple mixing of the following ingredients in the following order:

|  | Order | | | | | |
|---|---|---|---|---|---|---|
| Ingredient | 1 CAB-OJET 200 | 2 deionized water | 3 form-amide | 4 ethanol-amine | 5 diglycerol borate | 6 triethylene glycol monoethyl ether borate |
| Ink #4 | 20 | 15 | 40 | 5 | 20 | 0 |
| Ink #5 | 20 | 20 | 15 | 10 | 10 | 25 |

It is believed that these inks will exhibit characteristics and print quality values similar to those in Example X.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. An ink composition comprising water, a colorant, and a borate ester, said ink containing wafer in on amount of at least about 5 percent by weight and containing water in an amount of no more than about 50 percent by weight wherein either (a) the ink also contains an amine compound, or (b) the borate ester is hydrolytically stable.

2. An ink according to claim 1 wherein the ink contains water in on amount of at least about 10 percent by weight of the ink.

3. An ink according to claim 1 wherein the ink contains water in an amount of at least about 30 percent by weight of the ink.

4. An ink according to claim 1 wherein the ink contains water in an amount of no more than about 40 percent by weight of the ink.

5. An ink according to claim 1 wherein the borate ester is of the general formula

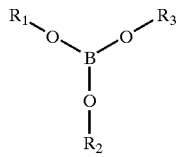

wherein $R_1$, $R_2$ and $R_3$ each, independently of the others, is on alkyl group, an aryl group, an arylalkyl group, an alkylaryl group, on alkoxy group, or a polyalkyleneoxy group, wherein $R_1$, $R_2$ and/or $R_3$ can be joined together to form an aliphatic or aromatic ring.

6. An ink according to claim 1 wherein the borate ester is of one of the general formulae

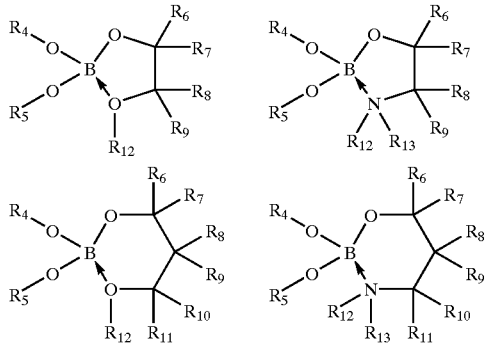

wherein $R_4$ and $R_5$ each, independently of the other, is on alkyl group, on aryl group, an arylalkyl group, an alkylaryl group, on alkoxy group, or a polyalkyleneoxy group, wherein $R_4$ and $R_5$ can be joined together to form a ring, $R_6$, $R_7$, $R_8$, $R_9$, $R_{10}$, and $R_{11}$ each, independently of the other, is a hydrogen atom, an alkyl group, an aryl group, an arylalkyl group, on alkylaryl group, an alkoxy group, a polyalkyleneoxy group, a hydroxy group, on amine group, a pyridine group, on ether group, an ester group, an amide group, or a carbonyl group, wherein one or more of $R_6$, $R_6$, $R_7$, $R_8$, $R_9$, $R_{10}$, and $R_{11}$ can be absent if a ring carbon atom has a double bond or a triple bond to another R group or to another ring carbon atom, and $R_{12}$ and $R_{13}$ each, independently of the other, is a hydrogen atom, on alkyl group, an aryl group, an arylalkyl group, an alkylaryl group, an alkoxy group, a polyalkyleneoxy group, wherein $R_6$, $R_7$, $R_8$, $R_9$, $R_{10}$, $R_{11}$, $R_{12}$ and/or $R_{13}$ can be joined together to form a ring.

7. An ink according to claim 1 wherein the borate ester is disorbitan borate, disorbitol borate, a borate ester of glycerin monoethoxylate, diglycerol borate, N,N-dibutylethanolamine glycerol borate, a glycerol borate monoester, sorbitol glycerol borate, bis-neopentylglycol borate, trimethylene borate, glycerol salicylamide borate, a borate ester of polyethylene glycol methyl ether, triethylene glycol monomethyl ether borate, salicylamide borate, N,N-dibutylethanolamine sorbitol borate, salicylamide sorbitol borate, N,N-dibutylethanolamine/triethylene glycol monobutyl ether borate, N,N-dibutylethanolamine/poly (propylene glycol) monobutyl ether borate, glycerol borate laurate, or mixtures thereof.

8. An ink according to claim 1 wherein the borate ester is monomeric.

9. An ink according to claim 1 wherein the borate ester is a polymer having at least some repeat monomer units derived from one or more monomeric borate esters.

10. An ink according to claim 1 wherein the borate ester is present in the ink in an amount of at least about 5 percent by weight of the ink, and wherein the borate ester is present in the ink in an amount of no more than about 50 percent by weight of the ink.

11. An ink according to claim 1 wherein the borate ester is hydrolytically stable.

12. An ink according to claim 1 wherein the borate ester either is derived from a Guerbet alcohol or has a nitrogen atom coordination bonded to a boron atom.

13. An ink according to claim 1 wherein the borate ester is (a) of the formula

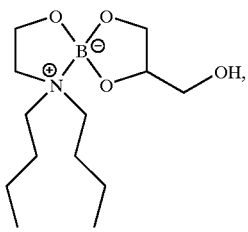

(b) of the formula

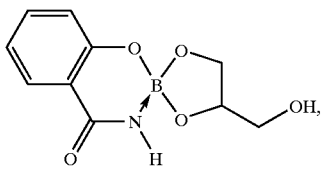

(c) of The formula

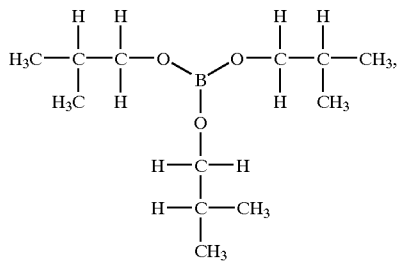

(d) of the formula

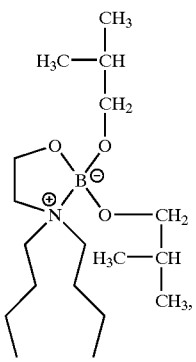

(e) of the formula

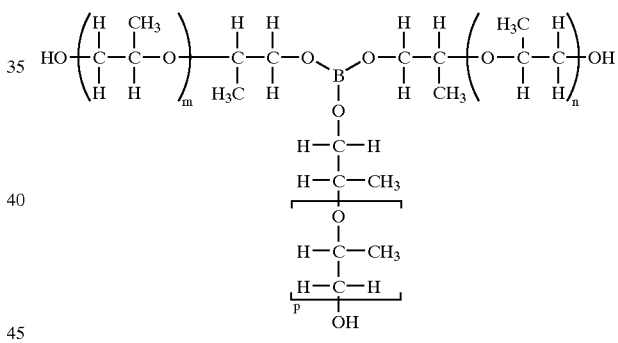

wherein m, n, and p ore each, independently of the others, integers representing the number of repeat propylene oxide units, (f) a borate ester of propylene glycol/ethylene glycol copolymers, or (g) mixtures thereof.

14. An ink according to claim 1 wherein the ink contains an amine compound.

15. An ink according to claim 14 wherein the amine compound is of the general formula

wherein $R_1$, $R_2$ and $R_3$ each, independently of the others, is a hydrogen atom, an alkyl group, on aryl group, an arylalkyl group, on alkylaryl group, on alkoxy group, or a polyalkyleneoxy group, provided that at least one of $R_1$, $R_2$ and $R_3$ is not a hydrogen atom, wherein two or more of $R_1$, $R_2$ and/or $R_3$ can be joined together to form a ring.

16. An ink according to claim 14 wherein the amine compound is monoethanolamine, diethylamine, diethylamine diethanolamine, N,N-dibutylethanol amine, 2-hydroxyethylpyridine, 3-hydroxy-2-hydroxymethylpyridine, 2-hydroxymethylpyridine, 1-(2-hydroxyethylpyrrolidine), (4-(2-diethylamine, hydroxy ethyl)-1-piperazine propanesulfonic acid), triethanol amine, triethanolamine ethoxylate, or mixtures thereof.

17. An ink according to claim 14 wherein the amine compound is present in the ink in on amount of at least about 1 percent by weight of the ink, and wherein the amine compound is present in the ink in an amount of no more than about 10 percent by weight of the ink.

18. A process which comprises incorporating into an ink jet printing apparatus an ink composition comprising wafer, a colorant, and a borate ester, sold ink containing water in an amount of at least about 5 percent by weight and containing water in an amount of no more than about 50 percent by weight, wherein either (a) the ink also contains an amine compound, or (b) the borate ester is hydrolytically stable, and causing droplets of the inks to be ejected in an imagewise pattern onto a recording substrate.

19. A process according to claim 18 wherein the printing apparatus employs a thermal ink jet process wherein the ink in the nozzles is selectively heated in an imagewise pattern, thereby causing droplets of the ink to be ejected in imagewise pattern.

20. A process according to claim 18 wherein the printing apparatus employs a piezoelectric ink jet process wherein droplets of the ink are caused to be ejected in imagewise pattern by oscillations of piezoelectric vibrating elements.

21. An ink according to claim 1 wherein the colorant consists of a dye.

22. An ink according to claim 1 wherein the borate ester is of the formula

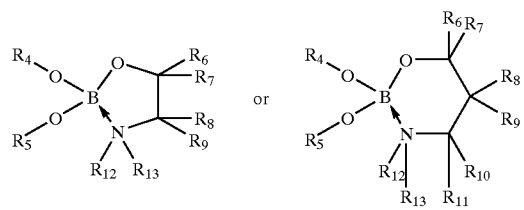

wherein $R_4$ and $R_5$ each, independently of the other, is on alkyl group, on aryl group, an arylalkyl group, an alkylaryl group, on alkoxy group, or a polyalkyleneoxy group, wherein $R_4$ and $R_5$ can be joined together to form a ring, $R_6$, $R_7$, $R_8$, $R_9$, $R_{10}$ and $R_{11}$ each, independently of the other, is a hydrogen atom, an alkyl group, an aryl group, an arylalkyl group, on alkylaryl group, an alkoxy group, a polyalkyleneoxy group, a hydroxy group, an amine group, a pyridine group, an ether group, an ester group, an amide group, or a carbonyl group, wherein one or more of $R_6$, $R_7$, $R_8$, $R_9$, $R_{10}$ and $R_{11}$ can be absent if a ring carbon atom has a double bond or a triple bond to another R group or to another ring carbon atom, and $R_{12}$ and $R_{13}$ each, independently of the other, is a hydrogen atom, an alkyl group, an aryl group, an arylalkyl group, an alkylaryl group, an alkoxy group, a polyalkyleneoxy group, wherein $R_6$, $R_7$, $R_8$, $R_9$, $R_{10}$, $R_{11}$, $R_{12}$ and/or $R_{13}$ can be joined together to form a ring.

23. An ink according to claim 1 wherein the borate ester is disorbitan borate, disorbitol borate, a borate ester of glycerin monoethoxylate, diglycerol borate, N,N-dibutylethanolamine glycerol borate, sorbitol glycerol borate, bis-neopentylglycol borate, trimethylene borate, glycerol salicylamide borate, a borate ester of polyethylene glycol methyl ether, triethylene glycol monomethyl ether borate, salicylamide borate, N,N-dibutylethanolamine sorbitol borate, salicylamide sorbitol borate, N,N-dibutylethanolamine/triethylene glycol monobutyl ether borate, N, N-dibutylethanolamine/poly(propylene glycol) monobutyl ether borate, sorbitan glycerol borate, or mixtures thereof.

* * * * *